April 30, 1963     M. P. WHITNEY ETAL     3,087,591
ENGINE STARTER DRIVE
Filed Nov. 16, 1960
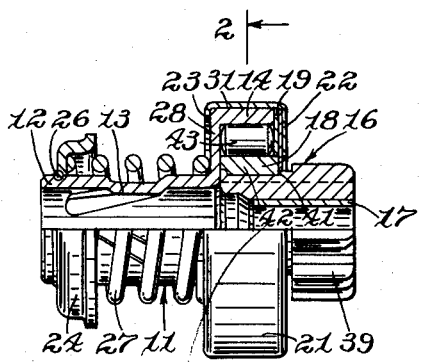
Fig. 1
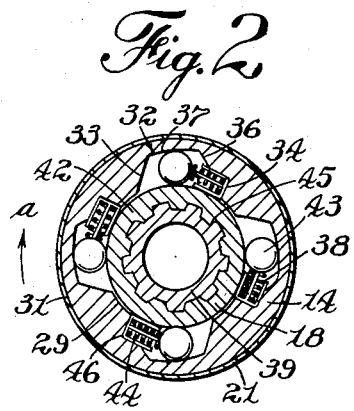
Fig. 2
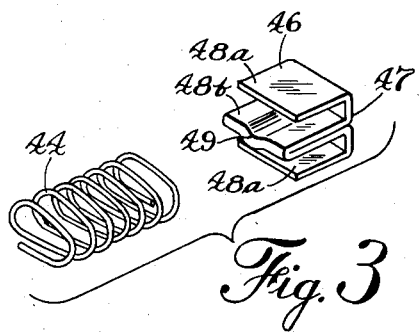
Fig. 3
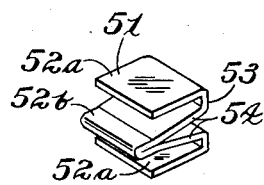
Fig. 4
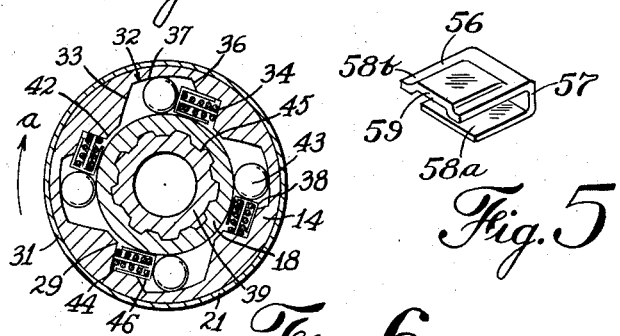
Fig. 5
Fig. 6
WITNESS:
Esther M. Stockton.
INVENTOR.
Maurice P. Whitney
Nelson H. Mageoch
BY
ATTORNEY

United States Patent Office 3,087,591
Patented Apr. 30, 1963

3,087,591
ENGINE STARTER DRIVE
Maurice P. Whitney and Nelson H. Mageoch, Elmira, N.Y., assignors to The Bendix Corporation, Elmira Heights, N.Y., a corporation of Delaware
Filed Nov. 16, 1960, Ser. No. 69,672
7 Claims. (Cl. 192—45)

This invention relates to engine starter drives of the positive shift type and more particularly relates to a unidirectional roller type overrunning clutch structure utilized in such a starter device.

Starter drives utilizing roller type overrunning clutches have been in general use for the better part of the last quarter of a century as is well illustrated in U.S. Patent 2,211,053 granted to Critchfield. Over the years there have been repeated efforts to improve on the Critchfield device and these efforts have been particularly directed toward increasing the strength of the structure while reducing the cost associated with its manufacture and fabrication. U.S. Patent 2,902,125 to House et al. was granted to cover a structure attaining these desired ends.

While certain improvements have been made to the basic design they have not resulted in the provision of a wholly trouble free clutch for starter drives. Certain objections and disadvantages have developed especially as relate to the clutch roller spring biasing mechanisms. It is, therefore, the primary object of the present invention to provide a roller type clutch adapted for use in starter drive gearing in which novel spring actuated roller biasing mechanisms overcome the previously experienced difficulties.

It is another object of the present invention to provide a roller type overrunning clutch for starter drives which can be economically manufactured and fabricated, which is durable structure-wise and which is efficient and reliable in operation.

It is still another object of the present invention to provide a roller type overrunning clutch in which novel spring actuated roller biasing mechanisms include substantially rectangularly shaped coiled compression springs.

It is a further object of the present invention to provide a novel spring guide member supported in each clutch roller recess.

It is still a further object of the present invention to provide a novel spring guide member which is adapted to support the roller biasing spring in such a way that the spring is free from detrimental physical contact with any portion of the clutch roller recess or the driven clutch member thereby eliminating undesirable spring wear.

It is still a further object of the present invention to provide a novel spring guide member which is adapted to effectively eliminate the over-compression of the roller biasing spring when the clutch elements assume the disengaged or overrunning position.

The foregoing and other objects and advantages of the invention will appear more fully in consideration of the detailed description which follows, wherein two embodiments of the invention and three modifications of the spring guide member thereof are illustrated. It is to be expressly understood, however, that the drawings are for the purpose of illustration and description and are not to be construed as defining the limits of the invention.

In the drawing:

FIGURE 1 is a longitudinal view, partly in section, illustrating a starter drive including a roller type overrunning clutch in which a preferred embodiment of the invention is utilized;

FIGURE 2 is a sectional view of the roller type overrunning clutch taken on the plane of line 2—2 of FIGURE 1, illustrating the clutch in the disengaged position;

FIGURE 3 is an enlarged exploded detailed perspective view of the preferred embodiment of the clutch roller biasing mechanism illustrating the spring and the spring guide member;

FIGURE 4 is an enlarged perspective view of a second embodiment of the spring guide member;

FIGURE 5 is an enlarged perspective view of a third embodiment of the spring guide member; and FIGURE 6 is a sectional view, similar to FIGURE 2, illustrating the guide members positioned in the roller recesses with the yoke portions thereof adapted to engage the rollers.

In FIGURE 1 there is illustrated a starter drive for an internal combustion engine which is secured to a power shaft (not shown) of a starting motor. A sleeve 12 forming a portion of the body assembly generally designated as 11 is supported on the power shaft and has helical threads 13 formed on its internal surface which engage complementing helical splines in the power shaft. Formed on the right extremity of the sleeve 12 (FIG. 1) is a driving or outer clutch element 14. The driving clutch element can be formed as an integral part of the sleeve, as by cold forming, or it can be separately formed and be joined to the sleeve by brazing or any other convenient method.

A pinion assembly 16 in coaxial alignment with the power shaft is slidably journalled by bearing means 17 on a reduced diameter portion of the shaft and supports the driven or inner clutch element 18 which is concentrically disposed within the driving clutch member 14. The clutch elements 14 and 18 are maintained in proper assembled relationship by washer means 19 supported on the pinion assembly 16 and the outer clutch member 14 carries an encompassing case member 21 which has inturned extremities 22 and 23 which hold the clutch elements in proper positional relationship thereby effectively uniting the body assembly 11 and the pinion assembly 16 as an operable unit.

A flange 24 locked against axial displacement to the left by a snap ring retainer 26 is supported adjacent the left extremity of the sleeve 12 with a mesh enforcing spring 27 concentrically disposed about the sleeve and asserting a bias upon the flange 24 and the driving clutch member 14. A fork member (not shown nor forming a part of the invention) when actuated by a solenoid member on the starting motor abuts the flange 24 and shifts the starter drive pinion 39 into driving engagement with a gear of an engine to be started.

The driving or outer clutch member 14 comprises a radial flange 28 having an annular portion providing inner and outer peripheral surfaces 29 and 31. The inner surface 29 defines an annular opening into which the driven clutch member 18 is disposed. Formed in the flange annulus and opening to the inner peripheral surface are a plurality of circumferentially spaced recesses generally indicated as 32 having end walls 33 and 34 and a connecting irregularly surfaced intermediate wall 36. Adjacent the recess end wall 33 the intermediate wall 36 is formed with a cam surface 37 eccentrically located relative to the axis of the clutch members. Adjacent the recess end wall 34 the recess is narrowed to house the clutch roller biasing mechanisms generally indicated as 38 which will be hereinafter described.

The pinion assembly 16 comprises a pinion gear 39 journalled by means of a bearing 17 on the reduced diameter portion of the power shaft. The rear extremity of the pinion is reduced in diameter to provide a radial shoulder 41 and a support for an annulus or collar member 42. The collar member abuts the shoulder and is axially secured to the pinion by any convenient method such as staking or brazing. The collar is also secured against rotation relative to the pinion by complementing serrations 45 formed on the reduced diameter portion of the pinion and on the internal diameter of the collar member. The outer peripheral surface of the collar provides a smooth cylindrical clutch surface which when the body assembly and pinion assembly are fabricated provides the driven clutch member previously described.

A plurality of rollers 43 of a predetermined diameter provide unidirectional driving engagement between the driving and driven clutch members 14 and 18, respectively. A roller is disposed in each recess 32. Also disposed in each recess is a roller biasing mechanism 38 of the type illustrated in the FIGURE 3. The biasing mechanism loosely positioned in each recess for free angular movement consists of a coiled compression spring 44 having helical coils shaped to substantially a rectangular configuration and a spring guide member 46. The spring is preferably rectangularly shaped to provide a greater spring factor in the narrow recess dimension. The spring guide member 46 in the preferred embodiment is trifurcated having a yoke 47 and normal depending tines indicated as 48a and 48b. Either of the exterior tines 48a provide bearing means slidably engaging the driven clutch member. The medial tine 48b is somewhat longer in length and has a channel 49 formed therein for additional strength. The longer medial tine 48b is intended to provide a spring compression limiting means. The coil spring 44 is supported by and encompasses the medial tine 48b. The free extremity of the spring extending beyond the end of tine 48b is adapted to compressively abut the associated roller 43 to urge the roller to a wedged position between the recess cam surface 36 and the clutch surface of the driven clutch member 18.

When the clutch assumes the driving condition the driving clutch member 14 will rotate in a direction indicated by the arrow a in FIGURE 2. Momentarily the pinion assembly 16 because it is in mesh with the engine gear will be motionless relative to the driving clutch and resultingly the combined effect of the rotation of the driving clutch, the meshed position of the pinion and the spring bias will be sufficient to cause the rollers to assume the wedged position between the cam surface of the outer clutch member and the clutch surface of the driven clutch member. Prior to the initial rotation of the starter motor the starter drive assembly will be shifted to the right in FIGURE 1 causing the meshing of the pinion 39 with a gear of the engine to be started. Should tooth abutment occur between the pinion and the engine gear the fork member will continue to urge the flange 24 in a meshing direction thus compressing the mesh enforcing spring 27. When the fork has moved a predetermined distance in the meshing direction the starting motor will be energized causing the initiation of power shaft rotation. This initial rotation will cause the clutch to become operative and the pinion will be rotated. Pinion rotation will result in pinion and engine gear alignment allowing the completion of the meshing action to occur. The moment the teeth become properly aligned the mesh enforcing spring 27 will be somewhat released from its compressed condition with the spring release energy being available to insure proper and quick mesh. The helical thread coupling between the power shaft and sleeve 12 will also materially assist in the meshing action after tooth abutment by translating some of the initial rotation into axial movement thus insuring a sufficient degree of pinion-engine gear engagement. Once the rollers have assumed the wedged position the driven clutch member 18 and the associated pinion 39 will be driven at the same speed as the starting motor power shaft.

Should the engine misfire or when a true start has been accomplished the pinion assembly 16 will then be driven by the engine gear at engine speeds which are in excess of the starting motor speeds thereby causing the overrunning clutch to function as desired to prevent the starting motor from being driven by the engine. The pinion 39 will maintain mesh with the engine gearing until such time as the solenoid is de-energized. The driving of the pinion assembly by the engine in effect causes the driven clutch member 18 to rotate relative to the driving clutch member 14. The result of this relative rotation causes the rollers 43 to be displaced within the outer clutch member recesses 32 in the direction of the arrow a out of the wedged position. It has been found that when this movement of the rollers out of the wedged position occurs it is accompanied by considerable kinetic force which is exerted on the biasing spring members 44. When the force occurs the springs are compressed but because of the medial tine 48b acting as a spring compression limiting means, the degree of spring compression is held within established tolerances and further force is exerted directly against the extremity of the tine 48b and transferred thereby to the yoke 47 and end wall 34 of the outer clutch member recess where it is effectively dissipated. Spring fatigue due to excessive over-compression of the spring is thereby effectively eliminated.

In FIGURE 4 a modification of the guide member is illustrated. The modified spring guide member 51 is also trifurcated having tines 52a and 52b and a connecting yoke 53. The medial Y-shaped tine is divided into diverging segments 54 which tend to lockingly engage the spring extremity and provide a slight flexing characteristic when the spring compression limiting means 52b becomes operative.

A bifurcated spring guide member 56 is illustrated in FIGURE 5 comprising a third modification of the spring guide member. The member 56 comprises a yoke 57 and normal depending tines 58a and 58b. Tine 58b is substantially longer and is formed with a reinforcing channel 59 for added strength to provide the spring compression limiting means. Tine 58a is adapted to slidably engage the inner clutch member cylindrical surface. The interpositioning of the tine 58a between the spring 44 and driven clutch 18 prevents the spring from riding on the clutch surface and being subjected to abnormal wear. The modified guide members 51 and 56 both function substantially in the same manner as the described preferred embodiment 46.

In the description the guide members have been described as being positioned in the driving clutch member recesses 32 with the yoke portions 47, 53 and 57 abutting the recess end walls 34. It will be readily apparent to those skilled in this art that the roller biasing mechanisms 38 could also be positioned in the recesses with the yokes adapted to engage the rollers 43 rather than the end walls, as is indicated in FIGURE 6. In that embodiment when the rollers are displaced from their wedged position they will abut the guide members and urge them towards the recess walls. The extremities of the spring compression limiting means or tines being of predetermined lengths will limit the displacement by abutting the recess end wall 34 and thereby effectively prevent further compression of the compression springs.

It will be apparent that other structural variations of the subject invention are possible within the scope of the teachings hereinabove set forth and it is contemplated that such variations shall come within the spirit and scope of the appended claims.

We claim:
1. A starter drive for an internal combustion engine having a clutch including a driving clutch member adapted to be connected to a power shaft of a starting motor and a driven clutch member in coaxial alignment with the power shaft connected to a pinion gear for cranking the engine, said clutch members being concentrically mounted, means providing a unidirectional driving connection between said clutch members comprising, in combination: a plurality of recess means including end walls and a connecting irregularly surfaced intermediate wall formed in one of said clutch members and opening radially towards the adjacent surface of the other of said clutch members; a cam surface eccentrically located relative to the axis of said clutch members formed in each recess and defining a portion of the irregular surface of the intermediate wall adjacent one of the recess end walls; a roller of a predetermined diameter positioned in each recess adapted to be wedged between the cam surface and said adjacent surface of said other clutch member when the unidirectional driving connection is established; a furcated guide member having a plurality of tines and being loosely positioned for free angular movement in each recess adjacent the other of said recess end walls; a resilient compression member supported by one of the tines of said guide member adapted to exert a force tending to move the roller to a wedged position; said tined guide member having other of said tines adapted to provide bearing means slidably engaging said adjacent surface of the other clutch member, said one tine providing a compression limiting means spatially disposed relative to the recess intermediate wall and said adjacent clutch surface; said compression limiting means being adapted to limit the roller movement when the clutch is disengaged.

2. A starter drive as set forth in claim 1 in which the resilient compression member supported by said one tine of the guide member comprises a helically coiled compression spring, said helical coils having a substantially rectangular configuration.

3. A starter drive as set forth in claim 1 in which the furcated guide member comprises a trifurcated element having a yoke connecting a medial tine and exterior tines, said medial tine being said one tine providing the compression member limiting means and one of said exterior tines being the other of said tines providing the bearing means slidably engaging said adjacent surface of said other clutch member.

4. A starter drive as set forth in claim 1 in which the furcated guide member comprises a bifurcated element having an interior tine and an exterior tine connected by a yoke member, said interior tine being said one tine providing the compression member limiting means; and the exterior tine being the other of said tines providing the bearing means slidably engaging said adjacent surface of said other clutch member.

5. A starter drive for an internal combustion engine having an overrunning clutch including an outer driving clutch member adapted to be connected to a power shaft of the starting motor and an inner driven clutch member in coaxial alignment with the power shaft connected to a pinion gear for cranking the engine, said clutch members being concentrically mounted, means providing a unidirectional driving connection between said clutch members comprising, in combination: a plurality of recess means formed in the driving clutch member including end walls and a connecting irregularly surfaced intermediate wall opening radially towards the adjacent surface of the driven clutch member; a cam surface eccentrically located relative to the axis of said clutch members in each recess defining a portion of said irregular surface adjacent one of the recess end walls; a roller of a predetermined diameter positioned in each recess adapted to be wedged between the cam surface and the adjacent surface of the driven clutch member when the unidirectional driving connection is established; a furcated guide member having a plurality of tines and being loosely positioned for free angular movement in each recess adjacent the other of said recess end walls; a helically coiled compression spring having a substantially rectangular coil configuration supported by one of the tines of said guide member adapted to exert a force tending to move the roller to a wedged position; other of said tines of said guide member providing bearing means slidably engaging said adjacent surface of the driven clutch member and providing a spring compression limiting means spatially disposed relative to the recess intermediate wall and said adjacent surface, said limiting means being encompassed by said spring and adapted to limit the roller movement when the clutch is disengaged.

6. A starter drive as set forth in claim 5 in which the furcated guide member is trifurcated.

7. A starter drive as set forth in claim 5 in which the furcated guide is bifurcated.

References Cited in the file of this patent
UNITED STATES PATENTS

| | | |
|---|---|---|
| 1,921,719 | Allen | Aug. 8, 1933 |
| 2,069,558 | Rauen et al. | Feb. 2, 1937 |
| 2,902,125 | House et al. | Sept. 1, 1959 |
| 2,939,323 | Kochendorfer | June 7, 1960 |